United States Patent
Packard

(10) Patent No.: US 9,095,799 B1
(45) Date of Patent: Aug. 4, 2015

(54) DEBRIS CATCHER AND SAND TRAP FOR PIPELINE

(71) Applicant: John Henry Packard, Douglas, WY (US)

(72) Inventor: John Henry Packard, Douglas, WY (US)

( * ) Notice: Subject to any disclaimer, the term of this patent is extended or adjusted under 35 U.S.C. 154(b) by 323 days.

(21) Appl. No.: 13/797,136

(22) Filed: Mar. 12, 2013

(51) Int. Cl.
| | |
|---|---|
| *B01D 36/04* | (2006.01) |
| *B01D 21/02* | (2006.01) |
| *B01D 35/02* | (2006.01) |
| *E21B 43/34* | (2006.01) |
| *B01D 21/00* | (2006.01) |
| *B01D 21/24* | (2006.01) |

(52) U.S. Cl.
CPC .......... *B01D 35/023* (2013.01); *B01D 21/0087* (2013.01); *B01D 21/02* (2013.01); *B01D 35/02* (2013.01); *B01D 36/04* (2013.01); *E21B 43/34* (2013.01); *B01D 21/2483* (2013.01); *B01D 2221/04* (2013.01)

(58) Field of Classification Search
CPC .......... B01D 21/0003; B01D 21/0087; B01D 21/02; B01D 21/245; B01D 21/2483; B01D 35/02; B01D 35/023; B01D 36/04; B01D 2221/04; E21B 43/34

USPC ........... 210/162, 170.01, 305, 310, 435, 459, 210/532.1, 533, 536; 166/75.12; 96/184
See application file for complete search history.

(56) References Cited

U.S. PATENT DOCUMENTS

| | | | | | |
|---|---|---|---|---|---|
| 1,496,090 | A | * | 6/1924 | Marker et al. | ........... 210/170.01 |
| 2,423,793 | A | * | 7/1947 | Olivo et al. | .................... 210/535 |
| 4,106,562 | A | * | 8/1978 | Barnes et al. | ............... 166/75.12 |
| 6,468,335 | B1 | * | 10/2002 | Polderman | ...................... 96/184 |
| 7,540,902 | B2 | * | 6/2009 | Esparza et al. | .................. 96/184 |
| 7,611,635 | B2 | * | 11/2009 | Chieng et al. | ................... 96/184 |
| 7,731,037 | B2 | * | 6/2010 | Frazier et al. | ............... 210/532.1 |
| 2004/0074838 | A1 | * | 4/2004 | Hemstock et al. | ............ 210/513 |
| 2005/0150842 | A1 | * | 7/2005 | Puik | ............................. 210/539 |
| 2011/0266228 | A1 | * | 11/2011 | Brown et al. | ............... 210/532.1 |

* cited by examiner

*Primary Examiner* — Christopher Upton
(74) *Attorney, Agent, or Firm* — Plager Schack LLP

(57) ABSTRACT

A debris catcher and sand trap for removing debris, sand, or both from a pipeline flow is disclosed. The debris catcher includes an upper pipe, a lower pipe, and at least one diagonal pipe. A grate filter may be disposed within the upper pipe and configured to retain or remove debris from a flow. The diagonal pipe and/or lower pipe may be configured for sand to settle in these areas, so that a flow exiting the lower pipe through a vertical pipe may be substantially free of sand or other fines.

12 Claims, 2 Drawing Sheets

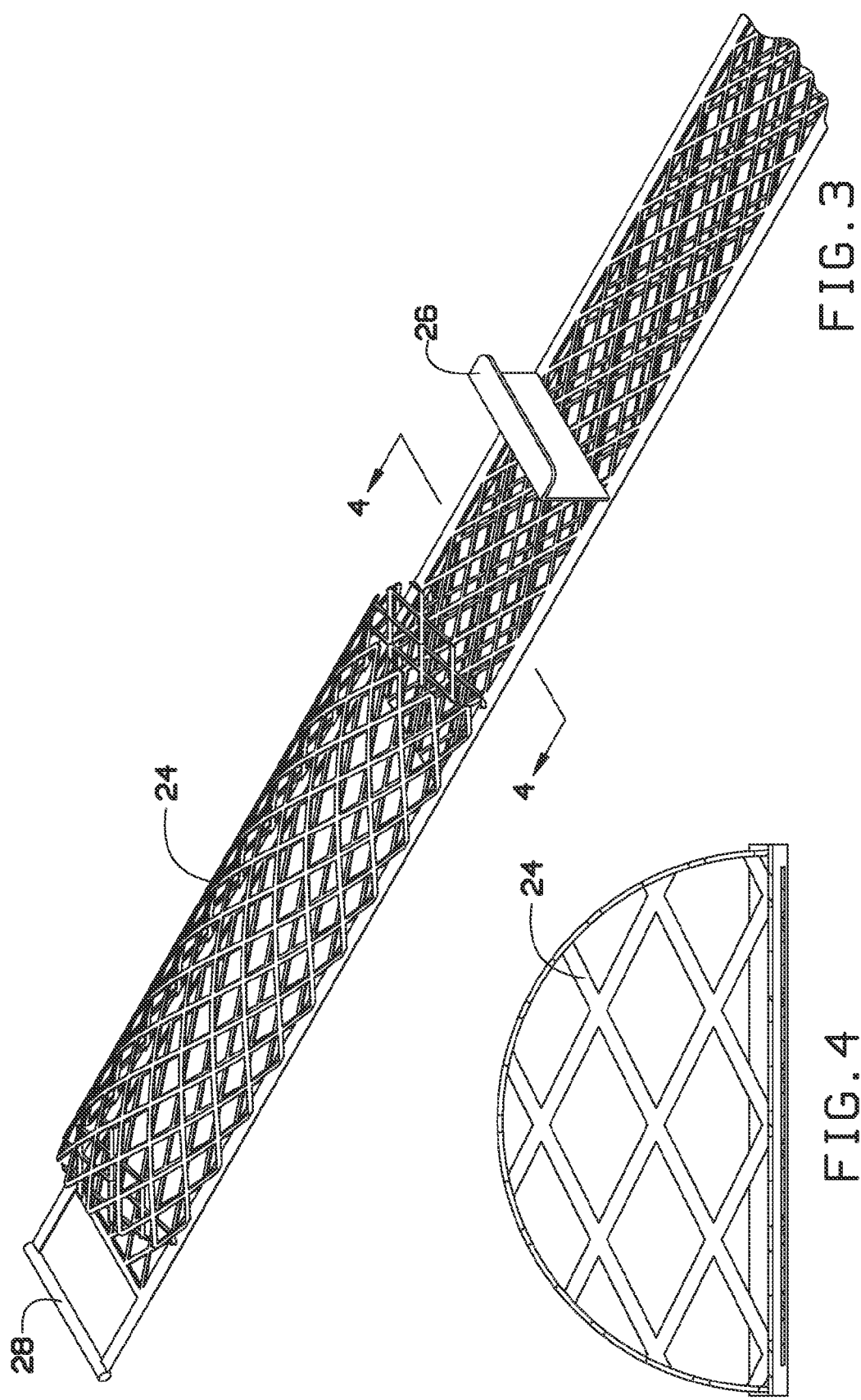

DEBRIS CATCHER AND SAND TRAP FOR PIPELINE

BACKGROUND OF THE PRESENT DISCLOSURE

1. Field of the Present Disclosure

The present disclosure is directed to a device and system for efficiently removing sand and/or debris from a flow in a pipeline, such as, e.g., an oil pipeline.

2. Related Art

In drilling and pumping oil from an oil well, a plug is commonly inserted into the shaft to set a fractionation interval. The plug may disintegrate over time, or it may be drilled out. In both cases, the plug can enter the oil pipeline in the form of sand and/or larger debris. Current filter systems and solutions are not completely effective. Current systems permit some sand and/or debris into the chokes on the pipeline and/or pump equipment. When current systems become clogged, they require a lengthy and time-consuming cleaning process before they are ready for use again.

SUMMARY OF THE PRESENT DISCLOSURE

The present disclosure provides a system that removes substantially all sand and debris from a pipeline flow, which results in a significant increase in efficiency and other advantages apparent from the discussion herein.

According to one aspect of the present disclosure, a system for removing debris, sand, or both from a pipeline flow includes an upper pipe, a first diagonal pipe, a lower pipe, a vertical pipe, and a grate filter. The upper pipe includes a first end and a second end. The first end is configured to receive an upper flow, which includes sand, debris, or both, from a pipeline. The first diagonal pipe is connected to the upper pipe and is configured to receive a first diagonal flow from the upper pipe. The first diagonal flow includes at least a portion of the upper flow. The lower pipe includes a first end and a second end. The lower pipe is connected to the first diagonal pipe and is configured to receive a lower flow from the first diagonal pipe. The lower flow includes at least a portion of the first diagonal flow. The lower pipe is configured to allow at least a portion of sand within the lower flow to settle in the lower pipe. The vertical pipe is connected to the lower pipe near its second end, and the vertical pipe is connected to the upper pipe near its second end. The vertical pipe is configured to receive a vertical flow from the lower pipe. The vertical flow includes at least a portion of the lower flow. The vertical pipe is configured to transfer at least a portion of the vertical flow to the upper pipe, so that the upper flow includes at least part of the vertical flow. The grate filter is disposed within the upper pipe. The grate filter is configured to retain at least a portion of the debris in the upper flow.

Additional features, advantages, and aspects of the present disclosure may be set forth or apparent from consideration of the following detailed description, drawings, and claims. Moreover, it is to be understood that both the foregoing summary of the present disclosure and the following detailed description are exemplary and intended to provide further explanation without limiting the scope of the present disclosure as claimed.

BRIEF DESCRIPTION OF THE DRAWINGS

The accompanying drawings, which are included to provide a further understanding of the present disclosure, are incorporated in and constitute a part of this specification, illustrate aspects of the present disclosure and together with the detailed description serve to explain the principles of the present disclosure. No attempt is made to show structural details of the present disclosure in more detail than may be necessary for a fundamental understanding of the present disclosure and the various ways in which it may be practiced. In the drawings:

FIG. 3 shows a grate filter, according to an aspect of the present disclosure; and FIG. 4 shows a section detail view of the grate filter of FIG. 3.

DETAILED DESCRIPTION OF THE PRESENT DISCLOSURE

Figure 1:
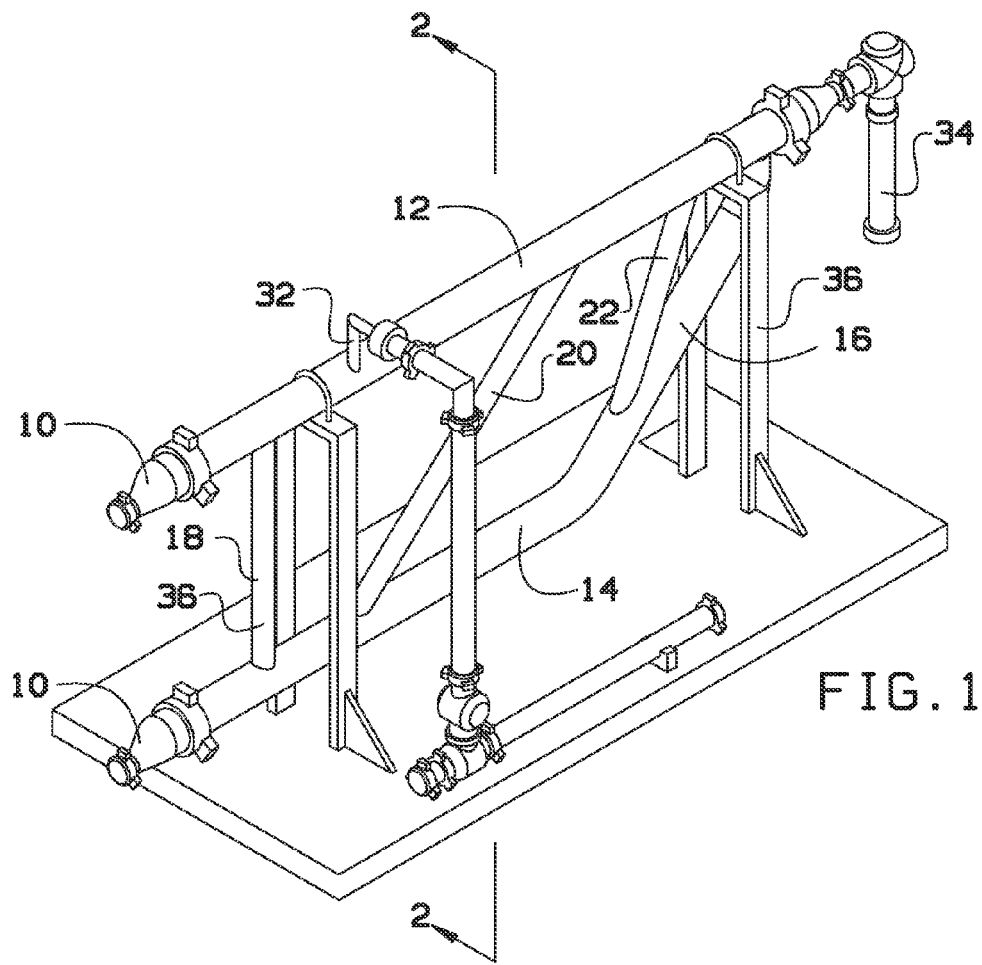
FIG. 1 shows a debris catcher and sand trap, according to an aspect of the present disclosure.

The aspects of the present disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the present disclosure. The examples used herein are intended merely to facilitate an understanding of ways in which the present disclosure may be practiced and to further enable those of skill in the art to practice the aspects of the present disclosure. Accordingly, the examples and aspects herein should not be construed as limiting the scope of the present disclosure, which is defined solely by the appended claims and applicable law. Moreover, it is noted that like reference numerals represent similar parts throughout the drawings.

FIG. 1 shows a debris catcher and sand trap, according to an aspect of the present disclosure. A debris catcher may include an upper pipe 12 that connects to a feed pipe 34 at one end and that has an end bell 10 attached to the opposite end. The feed pipe 34 may supply the debris catcher with a flow 30, such as, e.g., oil from an oil well. The upper pipe 12 may be supported by one or more support brackets 36. A first diagonal pipe 16 may be connected to the upper pipe 12 near the feed pipe 34. The first diagonal pipe 16 may be connected to a lower pipe 14, which may be substantially parallel to the upper pipe 12.

Figure 2:
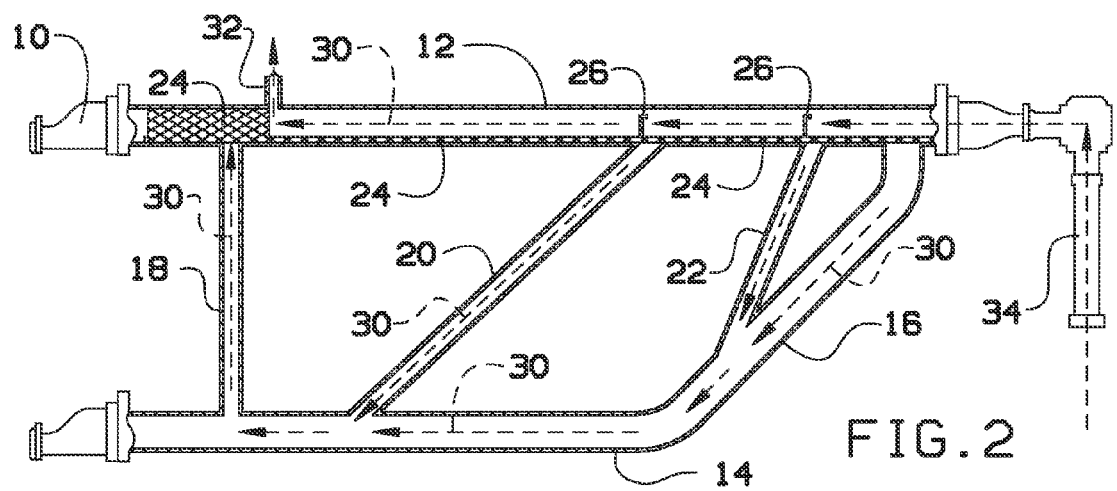
FIG. 2 shows a section detail view of the debris catcher of FIG. 1.

FIG. 2 shows a section detail view of the debris catcher of FIG. 1. FIG. 3 shows a grate filter 24, according to an aspect of the present disclosure, and FIG. 4 shows a section detail view of the grate filter 24. The grate filter 24 may be disposed within the upper pipe 12. The grate filter 24 may include one or more layers of metal mesh, crossed metal bars, or the like (hereinafter referred to as "mesh"). The mesh may be sized to trap or retain debris within the flow 30, such as, e.g., chunks of rock, pieces of a fractionation plug, and so on. The mesh may be sized to allow the flow 30 and fine particles, such as sand, grit, and the like, to pass through the mesh. The grate filter 24 may be removable from the upper pipe 12, for example, by opening the end bell 10. If the grate filter 24 becomes clogged, it may be easily removed from the upper pipe 12 and a new or clean grate filter 24 inserted, allowing the pipeline to continue operation with minimal downtime. The grate filter 24 may include a handle 28 to assist in removing the grate filter 24 from the upper pipe 12. The grate filter 24 may be placed or situated in the upper pipe 12 so that it covers the connection between the upper pipe 12 and the first diagonal pipe 16. In this way, the grate filter 24 may block or retain debris that may otherwise enter the first diagonal pipe 16.

Additional diagonal pipes 20, 22 may be situated or disposed between the upper pipe 12 and the lower pipe 14. For example, a second diagonal 22 pipe may be connected to the upper pipe 12 and the first diagonal pipe 16, and a third diagonal pipe 20 may be connected to the upper pipe 12 and the lower pipe 14. The grate filter 24 may cover the connection between the upper pipe 12 and the second diagonal pipe 22 and the connection between the upper pipe 12 and the third diagonal pipe 20. As before, the grate filter may block or retain debris that may otherwise enter the second diagonal pipe 22, the third diagonal pipe 20, or both. The angle of the diagonal pipes 16, 20, 22 may be selected to enhance or optimize settling or sedimentation of sand and other fines from the flow 30.

The grate filter 24 may include one or more plates 26 oriented at a substantially perpendicular angle to the flow 30 in the upper pipe 12. A plate 26 may be associated with a connection between the upper pipe 12 and one of the diagonal pipes 16, 20, 22. A plate 26 may direct some or all of the flow 30 in the upper pipe 12 into one or more of the diagonal pipes 16, 20, 22. When the flow 30 is redirected into a diagonal pipe 16, 20, 22 by a plate 26, the flow 30 may pass through the grate filter 24. The combination of the plate 26 and the grate filter 24 may improve or enhance the efficiency of filtering or removing debris from the flow 30. The plate 26 may incorporate a lip along its upper edge, which may further constrain or redirect the flow 30.

The debris catcher may include a vertical pipe 18 connected to the upper pipe 12 and the lower pipe 14. The vertical pipe 18 may be connected to the upper pipe 12 and the lower pipe 14 near the end bells 10. The vertical pipe 18 may carry the flow 30 from the lower pipe 14 to the upper pipe 12. The location of vertical pipe 18, as well as the length of the lower pipe 14, may be selected to optimize or enhance the settling or sedimentation of sand and other fines from the flow 30. The amount of sand and fines in the flow 30 in the vertical pipe 18 may be reduced or substantially eliminated. The end bell 10 on the lower pipe 14 may be opened to remove or clean out the accumulated sand, fines, and other sedimentation.

An exit pipe 32 may be located near the end bell 10 of the upper pipe 12. In this section of the upper pipe 12, the grate filter 24 may include an upper portion, which may conform to an inner dimension of the upper pipe 12. For example, the upper portion may be curved, as shown, e.g., in FIG. 3, so that it may be oriented in proximity with the upper part of the inside of the upper pipe 12. The upper portion of the grate filter 24 may serve as a final filter, removing any remaining debris and/or sand. Debris and/or sand in the flow 30 in the exit pipe 32 may be reduced or substantially eliminated, especially in comparison to the flow 30 entering from the feed pipe 34.

The debris catcher may be mounted, e.g., on skids or a trailer, which may allow the debris catcher to be easily positioned at a work site or moved between work sites. In operation, a second grate filter 24 may be stored nearby. If the grate filter 24 in use in the debris catcher becomes clogged, it may be removed and cleaned. While the filter is being cleaned, the spare filter may be inserted to continue operations with minimal interruptions.

While the present disclosure has been described in terms of exemplary aspects, those skilled in the art will recognize that the present disclosure can be practiced with modifications in the spirit and scope of the appended claims. These examples given above are merely illustrative and are not meant to be an exhaustive list of all possible designs, aspects, applications or modifications of the present disclosure.

What is claimed is:

1. A system for removing at least one of debris and sand from a pipeline flow, the system comprising:
    an upper pipe comprising a first end and a second end, the first end configured to receive an upper flow from a pipeline, the upper flow comprising at least one of debris and sand;
    a first diagonal pipe connected to the upper pipe, the first diagonal pipe configured to receive a first diagonal flow from the upper pipe, the first diagonal flow comprising at least a portion of the upper flow;
    a lower pipe comprising a first end and a second end, the lower pipe connected to the first diagonal pipe, the lower pipe configured to receive a lower flow from the first diagonal pipe, the lower flow comprising at least a portion of the first diagonal flow, the lower pipe further configured to allow at least a portion of sand within the lower flow to settle in the lower pipe;
    a vertical pipe connected to the lower pipe near the second end of the lower pipe, the vertical pipe connected to the upper pipe near the second end of the upper pipe, the vertical pipe configured to receive a vertical flow from the lower pipe, the vertical flow comprising at least a portion of the lower flow, the vertical pipe further configured to transfer at least a portion of the vertical flow to the upper pipe, the upper flow comprising at least a portion of the vertical flow; and
    a grate filter disposed within the upper pipe, the grate filter configured to retain at least a portion of debris in the upper flow.

2. The system of claim 1, wherein the vertical flow is substantially free of sand.

3. The system of claim 1, further comprising:
    an upper end bell associated with the second end of the upper pipe; and
    a lower end bell associated with the second end of the lower pipe.

4. The system of claim 1, further comprising:
    a second diagonal pipe disposed between the upper pipe and the lower pipe, the second diagonal pipe configured to receive a second diagonal flow from the upper pipe, the second diagonal flow comprising at least a portion of the upper flow, the second diagonal pipe further configured to transfer the second diagonal flow to the lower pipe, the lower flow comprising at least a portion of the second diagonal flow.

5. The system of claim 4, wherein the second diagonal pipe is directly connected to the first diagonal pipe.

6. The system of claim 4, wherein the grate filter comprises:
    a plate configured to direct at least a portion of the upper flow into the second diagonal pipe.

7. The system of claim 4, further comprising:
    a third diagonal pipe disposed between the upper pipe and the lower pipe, the third diagonal pipe configured to receive a third diagonal flow from the upper pipe, the third diagonal flow comprising at least a portion of the upper flow, the third diagonal pipe further configured to transfer the third diagonal flow to the lower pipe, the lower flow comprising at least a portion of the third diagonal flow.

8. The system of claim 7, wherein the grate filter comprises:

a plate configured to direct at least a portion of the upper flow into the third diagonal pipe.

9. The system of claim 1, further comprising:
an exit pipe connected to the upper pipe, the exit pipe configured to receive an exit flow from the upper pipe, the exit flow comprising at least a portion of the upper flow.

10. The system of claim 9, wherein the exit flow is substantially free of debris and sand.

11. The system of claim 1, wherein the grate filter is configured to be removed from the upper pipe.

12. The system of claim 11, wherein the grate filter comprises:
a handle configured to assist in removing the grate filter from the upper pipe.

* * * * *